Aug. 23, 1960 A. D. GLOVER 2,949,683
SPECTACLE DISPLAY DEVICE
Filed March 14, 1958 2 Sheets-Sheet 1

INVENTOR.
ANTHONY D. GLOVER
BY
*Raymond A. Paquin*
ATTORNEY.

Aug. 23, 1960  A. D. GLOVER  2,949,683
SPECTACLE DISPLAY DEVICE
Filed March 14, 1958  2 Sheets-Sheet 2
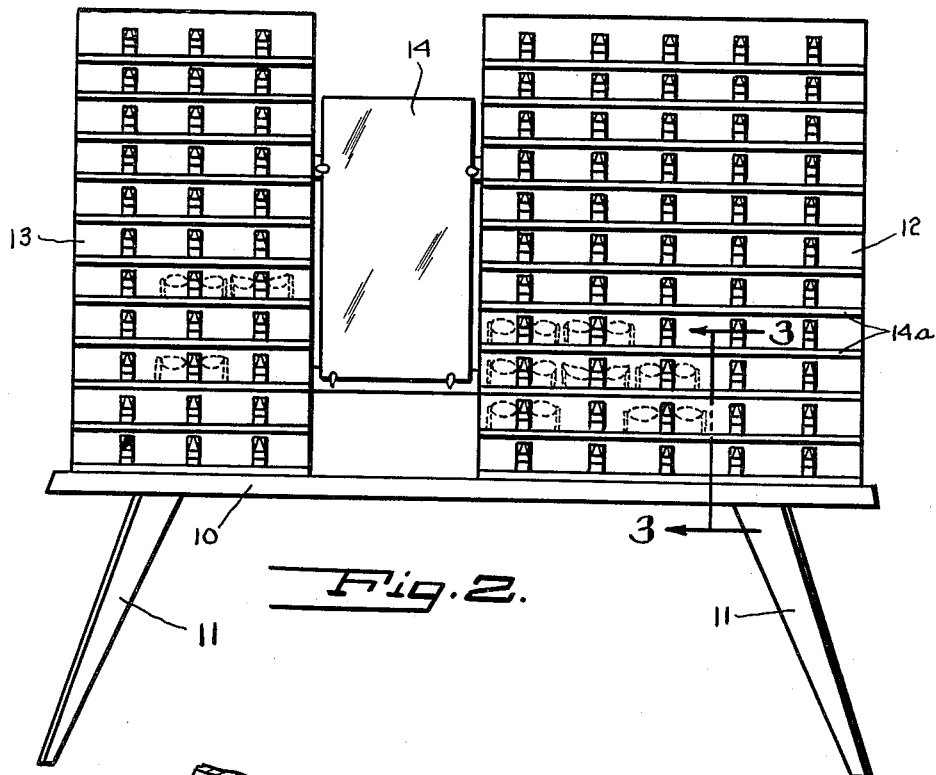
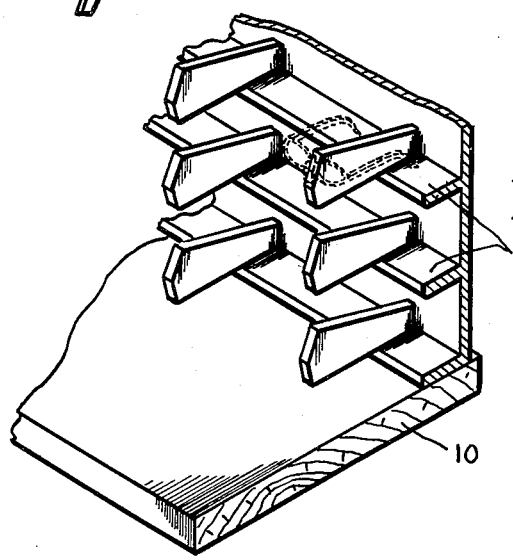
INVENTOR.
ANTHONY D. GLOVER
BY
Raymond A. Paquin
ATTORNEY.

2,949,683

Patented Aug. 23, 1960

2,949,683

SPECTACLE DISPLAY DEVICE

Anthony D. Glover, 615 N. Loop St., Austin, Tex.

Filed Mar. 14, 1958, Ser. No. 721,380

3 Claims. (Cl. 35—49)

This invention relates to spectacle display devices and has particular reference to a new and improved device for displaying spectacles in substantially the wearing position.

An object of the invention is to provide a new and improved device of the type set forth wherein spectacles may be supported in position substantially the same as when worn, and whereby the prospective purchaser may view the spectacle in such position.

Another object of the invention is to provide a device of the type set forth wherein a plurality of spectacles may be supported in wearing position in substantially adjacent relation whereby a prospective purchaser may readily view and compare the appearance of such spectacles, thereby facilitating the selection thereof.

Another object is to provide a new and improved device of the type set forth which is relatively simple and economical in construction.

Referring to the drawings:

Fig. 2 is a front or plan view of a device embodying a plurality of the units of Fig. 1; and Fig. 3 is a perspective sectional view taken on line 3—3 of Fig. 2, looking in the direction of the arrows.

Figure 1:
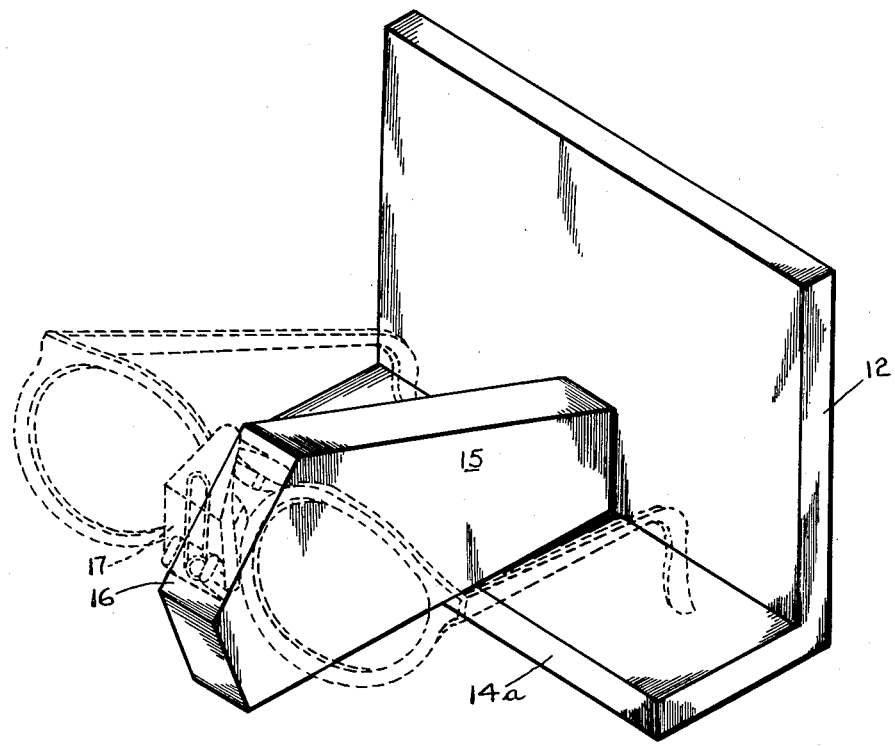
Fig. 1 is a perspective view of a unit embodying the invention.

Referring more particularly to the drawings wherein similar reference characters designate corresponding parts throughout, the device shown in Fig. 2 is shown on a supporting table or the like 10 supported by legs or the like 11, and comprises the upright supports 12 and 13 positioned on opposite sides of the mirror 14 adapted to be used by the prospective purchaser of the spectacles for viewing the spectacles on the face of the purchaser.

On each of upright supports 12 and 13 is provided a plurality of horizontal supports 14a, which supports are in vertically spaced relation.

The distance between adjacent horizontal supports should be at least the height of the spectacle, but is preferably such as to allow a considerable number of such horizontal supports to be carried by the upright support.

In spaced relation on each of the horizontal supports are provided the forwardly extending or projecting members 15 which may be secured to the upright support 12 or on the horizontal support 14a or both, and the length of such forwardly extending projecting members is at least the length of the spectacles to be displayed.

As shown in the drawings, the forwardly projecting members 15 are each provided with the forwardly tapering surface 16 adjacent their forward ends. Such surface 16 could be of other configuration than tapered, such as rounded, or otherwise formed to represent the nose of the wearer of the spectacles and such surface 16 contains a clip 17 or other supporting device for engaging the bridge of the spectacles to support them in normal wearing position.

The clip 17 shown is that of my patent application, Serial No. 483,550, filed January 24, 1955, now Patent No. 2,884,219 issued April 28, 1959, although, if desired, other forms of clips or supporting means could be employed such as a simple hook or depression in the surface 16 for receiving or supporting the bridge of the spectacle.

It will be understood that the device could be employed in single units, as shown in Fig. 1, or in the multiple units shown in Figs. 2 and 3.

In use, the spectacle frame is placed with the bridge of the spectacle engaging the clip or hook 17 and with the temples or bows of the spectacle resting on the horizontal support 14a on opposite sides of projecting member 15, as shown in Fig. 1.

This arrangement allows the prospective purchaser to see the spectacles in substantially wearing position and also allows the combining of a number of spectacles, thereby facilitating the selection of the spectacles desired by the prospective purchaser.

With the mirror positioned between the adjacent supporting sections, as shown in Fig. 2, the wearer can try on any of the spectacles which are easily removable and the prospective purchaser may then put on the various spectacles and inspect the spectacles on the face by looking at the mirror 14.

From the foregoing it will be seen that I have provided new and improved means for obtaining all of the objects and advantages of the invention.

I claim:

1. A spectacle display device for supporting spectacles in open position, said device including support means, at least one nose-like projection mounted on said support means to receive and support a spectacle frame by its bridge in wearing position with respect to said nose-like projection, and at least one generally horizontal bow-supporting shelf supported by said support means and associated with and spaced rearwardly of said nose-like projection to support the ear engaging ends of the bows of said spectacles when in extended position whereby said spectacles are supported for display and for easy access.

2. The display device of claim 1 in which a plurality of nose-like projections and associated generally horizontal bow-supporting shelves are provided.

3. The display device of claim 1 in which fastening means are mounted on said nose-like projection to secure a spectacle thereon.

References Cited in the file of this patent

UNITED STATES PATENTS

| | | |
|---|---|---|
| 547,470 | Zestermann | Oct. 8, 1895 |
| 2,411,361 | Bongiovanni | Nov. 19, 1946 |
| 2,467,251 | Bowman | Apr. 12, 1949 |
| 2,468,437 | Foley | Apr. 26, 1949 |
| 2,665,011 | Simjian | Jan. 5, 1954 |
| 2,713,947 | Foster | July 26, 1955 |
| 2,884,219 | Glover | Apr. 28, 1959 |
| 2,884,220 | Manley | Apr. 28, 1959 |